United States Patent [19]

Susko et al.

[11] Patent Number: 5,996,866
[45] Date of Patent: Dec. 7, 1999

[54] PHONE HOLDER FOR VEHICLE CONSOLE

[75] Inventors: Thomas Susko, Eastpointe; Robert Nino, Plymouth; Brett Jayroe, Shelby Township; Jackie A. Humphries, Marysville, all of Mich.

[73] Assignee: Lear Corporation, Southfield, Mich.

[21] Appl. No.: 09/163,145

[22] Filed: Sep. 29, 1998

[51] Int. Cl.⁶ .................................................. B60R 11/02
[52] U.S. Cl. ........................ 224/281; 224/570; 224/929; 296/37.8
[58] Field of Search ..................................... 224/281, 539, 224/549, 552, 553, 554, 570, 929; 296/37.1, 37.7, 37.8, 37.14

[56] References Cited

U.S. PATENT DOCUMENTS

| 4,981,277 | 1/1991 | Elwell | 248/311.2 |
|---|---|---|---|
| 5,033,709 | 7/1991 | Yuen | 248/313 |
| 5,179,590 | 1/1993 | Wang | 379/454 |
| 5,187,744 | 2/1993 | Richter | 379/449 |
| 5,284,314 | 2/1994 | Misaras et al. . | |
| 5,556,017 | 9/1996 | Troy | 224/549 |
| 5,671,877 | 9/1997 | Yabuya | 224/282 |
| 5,836,496 | 11/1998 | Levin et al. | 224/553 |

FOREIGN PATENT DOCUMENTS

| 2698057 | 5/1994 | France | 224/539 |
|---|---|---|---|
| 2822378 | 12/1979 | Germany | 224/929 |
| 361122052 | 6/1986 | Japan | 224/929 |
| 6305364 | 11/1994 | Japan | 224/929 |

*Primary Examiner*—D. Glenn Dayoan
*Assistant Examiner*—Paul Chenevert
*Attorney, Agent, or Firm*—Brooks & Kushman P.C.

[57] ABSTRACT

A vehicle console assembly includes a console body having an opening formed therein and a drawer movably positioned within the opening for movement between a closed position within the console body and an open position extending from the console body. The drawer includes a slot formed therein for receiving a portable phone. A power cord is connected to the drawer for providing power to the portable phone. The power cord is hidden from view within the console body. A release lever mechanism is provided for selectively securing and releasing the phone from the slot.

12 Claims, 2 Drawing Sheets

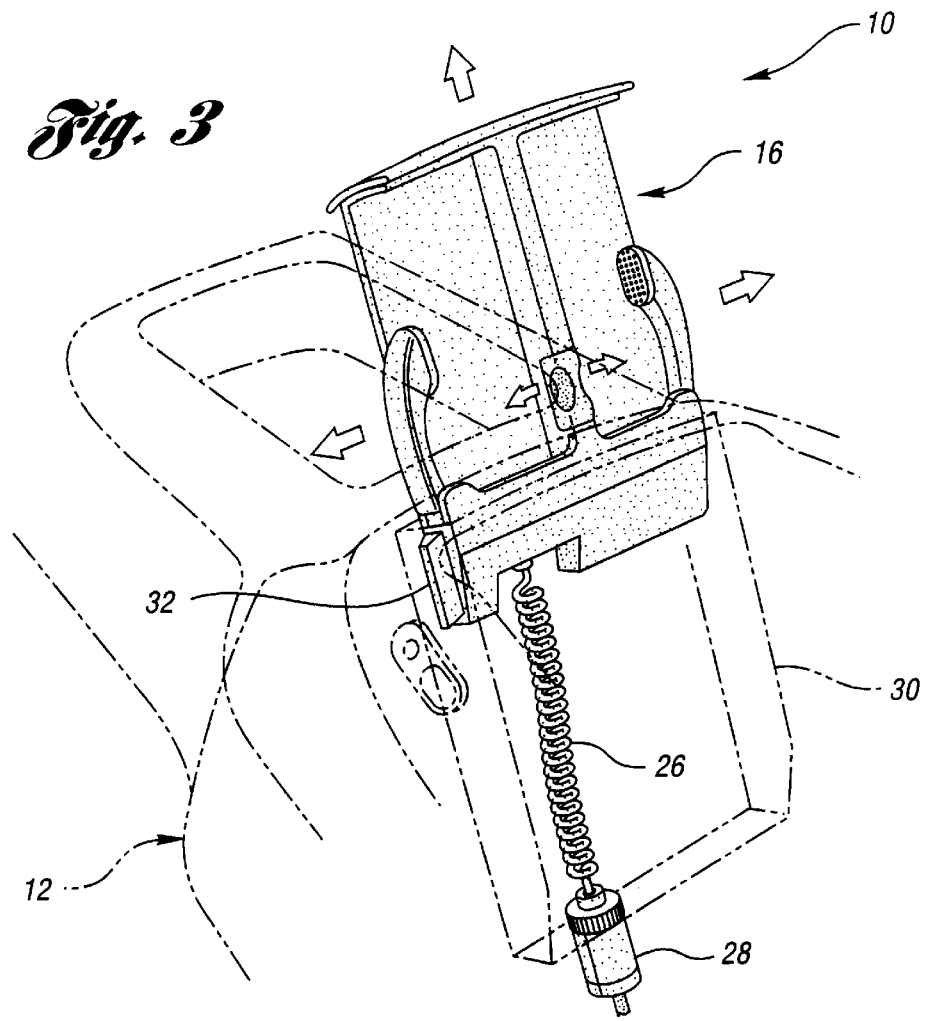
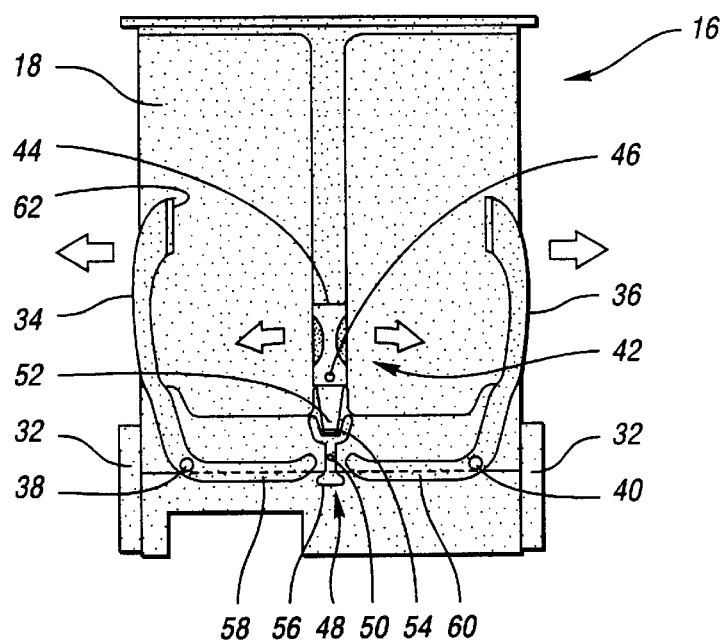

PHONE HOLDER FOR VEHICLE CONSOLE

TECHNICAL FIELD

The present invention relates to a phone holder for a vehicle console which is movable between closed and opened positions for alternatively concealing and exposing a vehicle portable phone.

BACKGROUND ART

In recent years, the use of portable phones has increased substantially. The term "portable phone" as used herein is intended to include wireless telephones, such as analog or digital cellular phones, PCS (personal communication systems), or other portable transmitter/receiver devices used for personal communication. Some such devices may be selectively plugged into power sources when not powered by a battery.

Portable phones are widely used in vehicles. However, most vehicles do not provide storage locations for the portable phones. Usually, the phones are simply laid across a seat or on the floor, or laid in a cup holder. Therefore, it is desirable to provide a structure for storing a portable phone in a vehicle wherein the portable phone and phone cord are normally hidden from view, while the portable phone is easily accessible to a vehicle driver for phone use.

SUMMARY OF THE INVENTION

The present invention overcomes the above-referenced vehicle portable phone storage problem by providing a movable drawer in a console body which includes a slot for receiving a phone, wherein the drawer is movable between a closed position for concealing the phone and an open position for exposing the phone for use.

More specifically, the present invention provides a vehicle console including a console body having an opening formed therein, and a drawer movably positioned within the opening for movement between a closed position within the console body and an open position extended from the console body. The drawer includes a slot formed therein for receiving a portable phone. A power cord is connected to the drawer for providing power to the portable phone. The power cord is hidden from view within the console body.

Preferably, a power outlet is positioned in the vehicle within the console body and is connected to the power cord. Additionally, an adjustable latch arm is pivotally connected to the drawer for securing the portable phone within the slot. The adjustable latch arm is sufficiently frictionally engaged with the drawer for securing the portable phone within the slot.

A release mechanism is connected to the drawer for releasing the latch arm. The release mechanism includes an exposed release lever pivotally connected to the drawer and a translator operatively connected between the release lever and the adjustable latch arm for pivoting the latch arm. The translator is pivotally connected to the drawer.

Accordingly, an object of the invention is to provide a structure for storing a portable phone and its power cord within a vehicle such that the power cord and phone may be hidden from view and the phone is readily accessible for use.

The above object and other objects, features and advantages of the present invention are readily apparent from the following detailed description of the best mode for carrying out the invention when taken in connection with the accompanying drawings.

BRIEF DESCRIPTION OF THE DRAWINGS

FIG. 3 shows a perspective view of the phone holder of FIG. 1 with the console body shown in phantom; and FIG. 4 shows a plan view of the phone holder of FIG. 3.

BEST MODE FOR CARRYING OUT THE INVENTION

Figure 1:
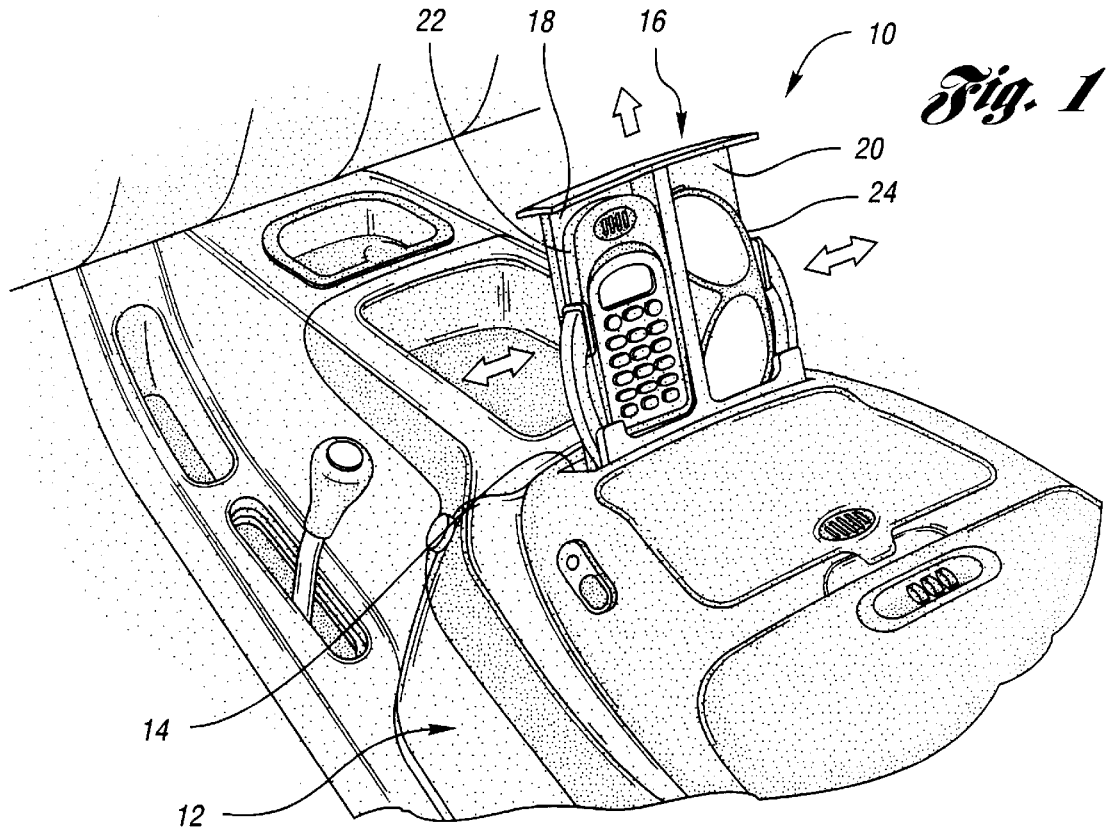
FIG. 1 shows a cut-away perspective view of a vehicle console assembly incorporating a portable phone holder in accordance with the present invention, with the phone holder in the open position.
Figure 2:
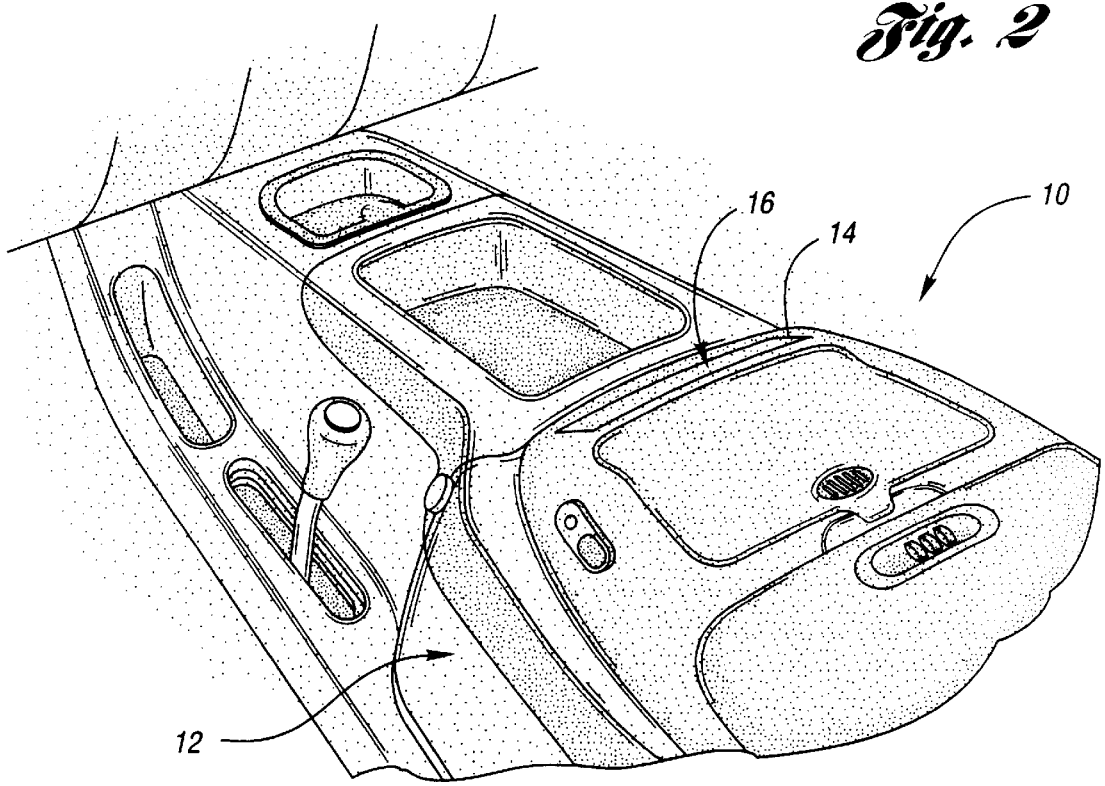
FIG. 2 shows the vehicle console assembly of FIG. 1 with the phone holder in the closed position.

Referring to FIGS. 1–3, a vehicle phone holder assembly 10 is shown in accordance with the present invention. The phone holder assembly 10 a console body 12 adapted for mounting in a vehicle. The console body 12 includes an opening 14 formed therein for receiving a drawer 16 which is movable between a closed position within the console body 12, as shown in FIG. 2, and an open position extended from the console body 12, as shown in FIG. 1. The drawer 16 includes first and second slots 18,20 formed therein. The first slot 18 is configured to receive a portable phone 22, and the second slot 20 is configured to store other objects, such as sun glasses 24, etc.

As shown in FIG. 3, a power cord 26 is connected to the drawer 16 for providing power to the portable phone 22 as needed. The power cord 26 is preferably a cord which is purchased with the phone. The drawer 16 simply provides a receptacle for supporting the plug associated with the cord so that the phone may be easily attached or detached. A power outlet or power point 28 is positioned in the vehicle within the console body 12 and connected to the power cord 26. In this configuration, the power cord 26 and power outlet 28 are hidden from passenger view at all times.

As shown in phantom in FIG. 3, a housing 30 may be provided within the console body 12 for receiving the drawer 16. In a preferred embodiment, the drawer 16 includes guide tabs 32 on opposing sides thereof for frictional sliding engagement within a correspondence track (not shown) within the housing 30. In this configuration, the drawer 16 is simply pushed or pulled by an operator as needed against the frictional force experienced by the tabs 32. This frictional force is sufficiently high to maintain the drawer 16 in position when no other forces are applied.

The present invention contemplates that any variety of known configurations may be used to complement the movement of the drawer 16, such as a spring loaded, push/push mechanism, a cam track guided mechanism, etc.

As shown most clearly in FIG. 4, the drawer 16 includes adjustable latch arms 34,36 pivotally connected thereto at pivot joints 38,40, respectively. The latch arms 34,36 are sufficiently frictionally engaged with the drawer 16 for securing the portable phone 22 and glasses 24, or other objects, within the slots 18,20. This frictional engagement is achieved by a designed interference fit between the arms 34,36 and the drawer 16. These components are preferably injection molded plastics.

A release mechanism 42 is operatively connected to the drawer 16 for actuating release of the latch arm 34,36. The release mechanism 42 includes an exposed release lever 44 pivotally connected to the drawer 16 at the pivot joint 46, and a translator 48 pivotally connected to the drawer 16 at the pivot joint 50. The translator 48 is operatively connected between the release lever 44 and the first and second adjustable latch arms 34,36 for pivoting the latch arms 34,36. The release lever 44 includes a protruding distal end 52 which is engageable within a receiver opening 54 formed in the translator 48, which captures the distal end 52 for translating pivotal movement between the release lever 44 and translator 48. The opposite end 56 of the translator 48 is alternatively engageable with the legs 58,60 of the latch arms 34,36, respectively, for pivoting the latch arms 34,36 about the respective pivot joints 38,40.

Accordingly, in order to release the portable phone 22 from the slot 18, the release lever 44 is pivoted counterclockwise about the pivot joint 46 as viewed in FIG. 4, which rotates the translator 48 clockwise about the pivot joint 50, thereby rotating the latch arm 34 counterclockwise about the pivot joint 38 which moves the pad 62 away from the portable phone to release the phone from the slot 18.

While the best mode for carrying out the invention has been described in detail, those familiar with the art to which this invention relates will recognize various alternative designs and embodiments for practicing the invention within the scope of the appended claims.

What is claimed is:

1. A vehicle console comprising:

a console body having an opening formed therein;

a drawer movably positioned within said opening for movement between a closed position within the console body and an open position extended from the console body, said drawer having a slot formed therein configured for receiving a portable phone;

a power cord connected to said drawer for providing power to the portable phone, said power cord being hidden from view within the console body;

a power outlet positioned within said console body and connected to the power cord;

an adjustable latch arm pivotally connected to the drawer for securing the portable phone within the slot;

wherein said adjustable latch arm is sufficiently frictionally engaged with the drawer for securing the portable phone within the slot; and a release mechanism connected to said drawer for releasing the latch arm, said release mechanism comprising an exposed release lever pivotally connected to the drawer and a translator operatively connected between said release lever and said adjustable latch arm for pivoting the latch arm.

2. The vehicle console of claim 1, wherein said translator is pivotally connected to the drawer.

3. The vehicle console of claim 2, wherein one of said release lever and translator comprises a protruding distal end and the other of said release lever and translator comprises a receiver opening for capturing said distal end for translating pivotal movement therebetween.

4. A vehicle console comprising:

a console body having an opening formed therein;

a drawer movably positioned within said opening for generally vertical linear movement between a closed position within the console body and an open position extended in said generally vertical direction from the console body, said drawer having a slot formed therein configured for receiving a portable phone;

and an adjustable latch arm pivotally connected to the drawer for securing the portable phone within the slot.

5. The vehicle console of claim 4, further comprising a release mechanism connected to said drawer for releasing the latch arm, said release mechanism comprising an exposed release lever pivotally connected to the drawer and a translator operatively connected between said release lever and said adjustable latch arm for pivoting the latch arm.

6. The vehicle console of claim 4, further comprising a power outlet positioned within said console body and connected to a power cord.

7. The vehicle console of claim 4, wherein said adjustable latch arm is sufficiently frictionally engaged with the drawer for securing the portable phone within the slot.

8. The vehicle console of claim 5, wherein said translator is pivotally connected to the drawer.

9. The vehicle console of claim 8, wherein one of said release lever and translator comprises a protruding distal end and the other of said release lever and translator comprises a receiver opening for capturing said distal end for translating pivotal movement therebetween.

10. The vehicle console of claim 5, wherein said drawer includes a second latch arm pivotally engaged with said translator, whereby said second latch arm is movable by means of said release mechanism.

11. The vehicle console of claim 10, wherein said drawer forms a second slot therein adjacent said second latch arm, wherein said second latch arm is operative to secure an object within the second slot.

12. A vehicle console comprising:

a console body having an opening formed therein;

a drawer movably positioned within said opening for movement between a closed position within the console body and an open position extended from the console body, said drawer having a slot formed therein configured for receiving a portable phone;

a power cord connected to said drawer for providing power to the portable phone, said power cord being hidden from view within the console body;

a power outlet positioned within said console body and connected to the power cord;

an adjustable latch arm pivotally connected to the drawer for securing the portable phone within the slot; and a release mechanism connected to said drawer for releasing the latch arm, said release mechanism comprising an exposed release lever pivotally connected to the drawer and a translator operatively connected between said release lever and said adjustable latch arm for pivoting the latch arm.

* * * * *